INVENTOR.
Arthur E. Snowdon
BY
Johnson and Kline
ATTORNEYS

April 14, 1970   A. E. SNOWDON   3,506,859
ELECTRIC STEPPING MOTOR WITH PLURAL FIELD WINDINGS AND
ENERGIZING CIRCUITRY
Filed Jan. 10, 1969   2 Sheets-Sheet 2
*Fig. 4*
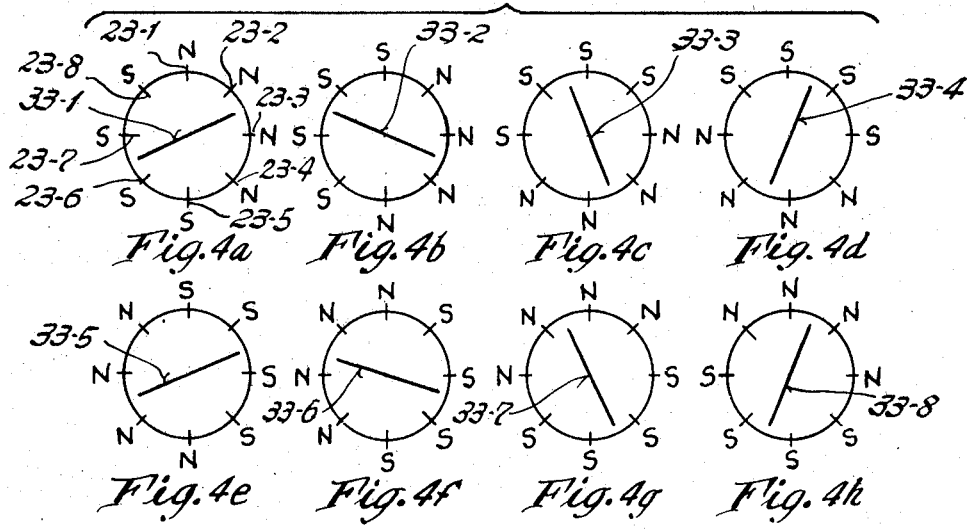
Fig.4a   Fig.4b   Fig.4c   Fig.4d
Fig.4e   Fig.4f   Fig.4g   Fig.4h
*Fig. 5*
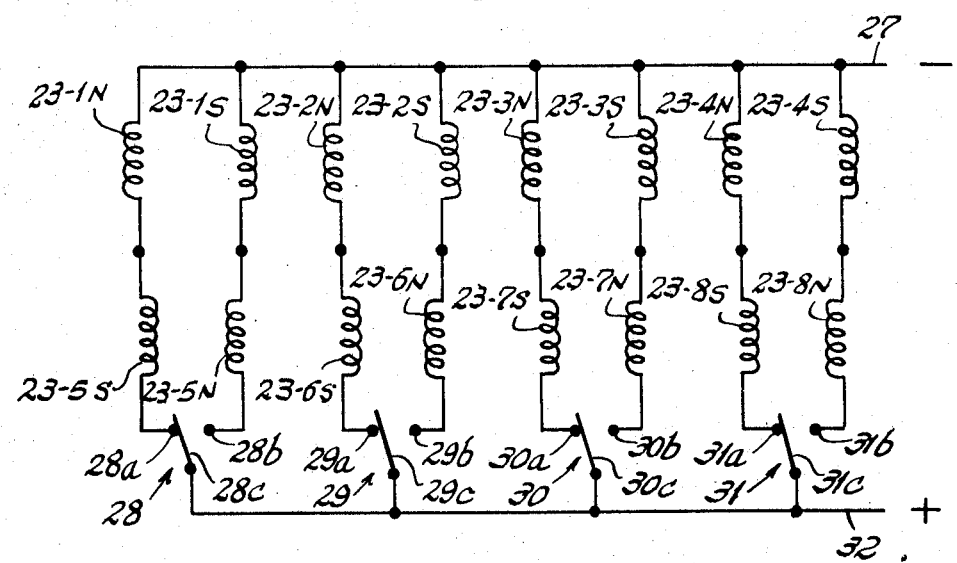
INVENTOR.
Arthur E. Snowdon
BY
Johnson and Kline
ATTORNEYS

United States Patent Office 3,506,859
Patented Apr. 14, 1970

3,506,859
ELECTRIC STEPPING MOTOR WITH PLURAL FIELD WINDINGS AND ENERGIZING CIRCUITRY
Arthur E. Snowdon, Bristol, Conn., assignor to The Superior Electric Company, Bristol, Conn., a corporation of Connecticut
Filed Jan. 10, 1969, Ser. No. 790,326
Int. Cl. H02k 29/02, 37/00
U.S. Cl. 310—89          10 Claims

ABSTRACT OF THE DISCLOSURE

A stepping motor capable of producing small increments of movement, as for example 1000 steps per revolution, with each change of energization of its windings providing a step and for maintaining its position when the energization is unchanged. The motor has a toothed rotor and a plurality of toothed stator poles with the pitch of the rotor teeth being one tooth different from the pitch of the stator teeth and each change of energization causes the rotor to advance one increment having a length that is the reciprocal of the number of rotor teeth times the number of stator poles.

---

In U.S. Patent No. Re. 25,445, assigned to the assignee of the present invention, there is disclosed a stepping motor that has a toothed rotor and a stator formed with a plurality of poles with the periphery of the poles formed with teeth. The tooth pitch of the rotor varies from the pitch of the stator teeth so that there is a difference of two teeth therebetween. Additionally, the poles are energized by their windings in a manner which causes the rotor to advance an increment or step which is the reciprocal of the number of rotor teeth times only one-half the number of poles. Though this motor has been found to be satisfactory in the number of steps per revolution, in some instances, requiring a larger number of steps per revolution, it has not been found completely acceptable.

It is accordingly an object of the present invention to provide a stepping motor having a large number of steps per revolution without any substantial decrease in torque over similar type lower resolution motors.

Another object of the present invention is to achieve the above object with a motor in which each step is of essentially the same precise length and in which the motor is capable of being maintained braked at any one of the steps.

A further object of the present invention is to achieve the above objects with a stepping motor that is simple in construction, relatively economical to manufacture, durable in use and which has many components similar or identical with presently produced lower revolution motors.

In carrying out the present invention there is provided a stepping motor which in the specific embodiment shown has somewhat similar components to the stepping motor described in the above-noted reissue patent. There is a rotor having an axially magnetized magnet which magnetizes one rotor end piece as a N pole and another rotor end piece as a S pole. The rotor end pieces are symmetrical but otherwise identical and each is formed with the same number of peripheral teeth. The stator in the specific embodiment hereafter described is formed to provide a plurality of inwardly extending poles, specifically eight, with the inner periphery of the poles being arcuate and also formed with teeth. A winding means encircles each pole and is capable upon energization of magnetizing its associated pole to be either a N pole or a S pole.

The pitch of the teeth of the rotor and the teeth of the stator are dependent upon the desired resolution of the motor taken in conjunction with the number of poles in the stator and accordingly may vary for motors having different resolutions. However in each construction, the pitch of the rotor and stator will be different with the pitches being such as to produce a one tooth difference. The rotor will always have one tooth more or less than may be theoretically formed in the stator. It will be noted that the periphery of each stator pole lies on a circle which circumscribes the rotor end pieces, but the circle is discontinuous, forming gaps between the poles in order to delineate the poles and permit the winding means to be inserted into the poles.

The winding means of diametrically opposite poles are connected in series with there being in an eight pole motor four winding sets. Each winding set is independently energizable and the poles of each set will have opposite magnetic polarity. Also, by changing the energization of the set, the polarity of the poles can be reversed.

In the operation of the motor, all poles are normally magnetized with one-half of the poles having an N polarity and the other half having an S polarity. All the N poles are grouped on one side of a diametric line and all the S poles grouped on the other side. The magnetic field thus established is theoretically concentrated on a diametric magnetic line from the median of one group of poles to the median of the other group of poles and is perpendicular to the diametric line that divides the poles. The magnetized rotor end pieces will have one tooth align itself on the magnetic line with a theoretical tooth of the stator where the magnetism produced by the poles and the permanent magnet is unlike. Diametrically opposite on the magnetic line where the magnetisms are the same the rotor end piece tooth will be as misaligned as possible, namely ½ a tooth pitch from the theoretical stator tooth.

A change of energization of the windings rotates the diametric magnetic line a fraction of a revolution that is equal to the reciprocal of the number of poles and this will cause the rotor to move to provide tooth alignment and misalignment along the magnetic line. One revolution of the magnetic line requires as many changes of energization as there are poles. In the embodiment shown, an eight pole motor, the sequence of energizations to complete a revolution of the magnetic line requires eight changes, each of which produces a different combination of the magnetic polarity of the poles and for each sequence of eight energizations, the rotor will be advanced one rotor tooth pitch. Accordingly, with an eight pole motor and a 125 tooth rotor, the incremental movement for each change of energization will be the reciprocal of eight times 125. By varying the number of teeth and the number of poles the increment may be altered over a substantial range.

Other features and advantages will hereinafter appear.

FIG. 4 consists of eight pictorial representations, 4a–4h, of the pole magnetism and the position of the diametric magnetic line for each of the changes of energization in the sequence.

FIG. 5 is an electrical schematic diagram of the motor and a circuit for effecting the changes in energization.

Figure 1:
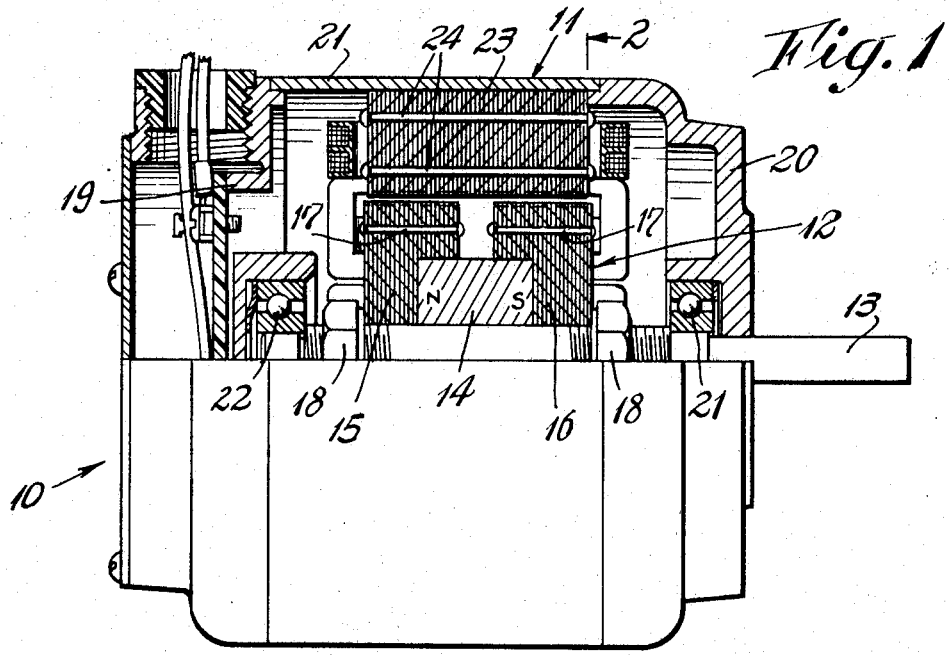
FIGURE 1 is an elevation, partly in section, of the motor of the present invention.

Referring to FIG. 1, the motor of the present invention is generally indicated by the reference numeral 10 and includes a stator 11 and a rotor 12. The rotor has an output shaft 13 on which is secured a permanent magnet 14 that is magnetized axially to have the poles indicated by the letters N and S. An N rotor end piece 15 and an S end piece 16 abut the ends of the magnet to assume the magnetic polarity of the ends. Preferably the end pieces are formed of laminated steel held together in any convenient manner as by rivets 17. The end pieces 15, 16 and the permanent magnet 14 may be secured on the shaft 13 as by the use of nuts 18.

The stator 11 includes a rear end bell 19 and a front end bell 20 together wtih an annular shell 21. Ball bearings 21 and 22 are contained in the end bells to support the shaft 13 for rotation. Press fitted or otherwise secured to the inner annular shell 21 is a pole forming member 23 formed of laminations of thin, sheet steel fastened together as by rivets 24, the laminations each having an identical shape.

Figure 2:
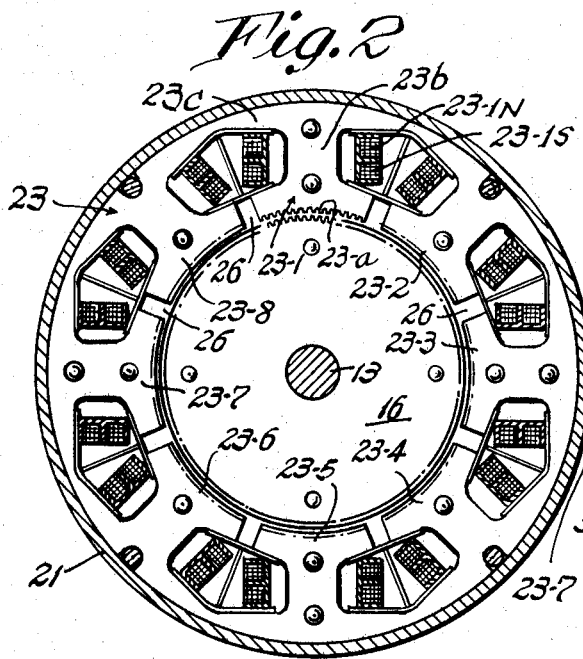
FIG. 2 is a section taken on the line 2—2 of FIG. 1.

Referring to FIG. 2, the pole forming member 23 is provided with eight poles 23–1 through 23–8 with each pole having an inner periphery 23a and a reduced intermediate portion 23b. The poles are connected together by an exterior annular portion 23c. As shown, a winding means encircles the intermediate portion 23b of each pole and the winding means for the pole 23–1 is indicated by the reference designations 23–1N and 23–1S. While the winding means for the pole may be merely one coil of wire, preferably to facilitate changes of energization, the winding means is bifilar and therefore divided into two identical coils. The energization of one coil will cause the pole to assume one magnetic polarity while energization of the other coil will produce the opposite magnetic polarity in the pole.

Each of the other poles has a similar winding means with the coils thereof being identified by its reference character including either the letter N or S such that with energization of the coil having an N, its associated pole is magnetized north while with energization of the coil having the letter S, the pole becomes magnetized south. In all conditions of operation, one coil of each pole is energized at all times but no more than just one coil.

The inner peripheries of the poles lie on a circle but the circle is discontinuous by the existence of gaps such as gap 26 formed between adjacent poles. The gaps not only subdivide the stator into poles but also permit the winding means to be positioned about the intermediate portions.

Assuming however that the gaps do not exist, the circle is subdivided into the number of teeth which the stator is desired to have and these teeth are formed on the inner periphery of the stator poles. The gap width may be a whole number multiple of the stator tooth pitch making all the poles identical or it may be a fraction of the tooth pitch which would cause the poles to be slightly different by having fractional teeth on each end. In either construction, all the teeth formed in the stator poles have the same tooth pitch and are equally spaced about the theoretical stator circle.

The periphery of the end pieces 15 and 16 are also formed with equally spaced teeth. The tooth pitch of the stator and the tooth pitch of the rotor are however sufficiently different so that there is a difference in the number of teeth of the rotor end piece and the theoretical circle to cause a one tooth difference with the rotor preferably having the larger number of teeth. Thus in one embodiment the stator may have a tooth pitch of $1/124$ providing 124 theoretical teeth while the rotor has 125 teeth. Another example is for the stator circle to have 49 teeth while the rotor has 50 teeth.

Referring to FIG. 5, there is shown a schematic diagram of the interconnections of the winding means together with switches for effecting the desired energization. Each of the coils of the winding means is identified by a four character reference identification such as 23–1N with 23–1 indicating the stator pole and the N, the coil associated therewith that when energized causes the pole to have an N magnetic polarity. The coil 23–1N and the coil 23–5S are connected in series as are the coils 23–1S and 23–5N. One end of each of these pairs of serially connected coils is connected to a negative supply 27 while the other ends are connected to contacts 28a and 28b respectively of a single pole, double throw switch 28 having an arm 28c. Similarly the coils 23–2N and 23–6S are connected to a contact 29a while the coils 23–2S and 23–6N are connected to a contact 29b of a switch 29 having an arm 29c. The coils 23–3N and 23–7S are connected serially to a contact 30a while the coils 23–3S and 23–7N are connected to a contact 30b of a switch 30 having an arm 30c. The coils 23–4N and 23–8S are connected to a contact 31a while the coils 23–4S and 23–8N are connected to a contact 31b of a switch 31 having an arm 31c. The arms of the switches are connected in parallel to a common positive supply 32 while the ends of the serially connected coils are connected to the negative supply 27.

It will be understood that by reason of the single pole, double throw switches 28–31, only one coil of a pole may be energized at a time, that movement of the arm of a switch from one position to the other shifts the magnetization of a pole from one magnetic polarity to the other and that diametrically opposite poles are always magnetized of the opposite polarity.

With the arms shown in their solid position, wherein all the contacts having a letter a are engaged, the windings will cause the poles to be magnetized according to the polarities shown in FIG. 4a. With this energization poles 23–1 through 23–4 are N poles and poles 23–5 through 23–8 are S poles. The flux of the poles may be considered concentrated intermediate the four poles as indicated by a diametric magnetic line 33–1 so that the N and S concentrations are theoretically diametrically opposite thereo. By changing the arm 28c to engage the contact 28b, leaving the other switches unchanged, there will again be four poles 23–2 through 23–5 magnetized N and four poles 23–6 through 23–1 energized S poles with the theoretical concentration of the magnetic flux being along the line 33–2. For the next energization in the sequence, only the arm 29c is moved to engage the contact 29b to thereby cause poles 23–3 through 23–6 to be N poles and 23–7 through 23–2 to be S poles so that the magnetism of the poles will be theoretically concentrated along the line 33–3. Similarly by shifting the arm 30c to engage contact 30b, the poles are magnetized as shown in FIG. 4d and the line 33–4 indicates the theoretical concentration of the magnetic flux. For the magnetization shown in FIG. 4e by the line 33–5, the arm 31c is caused to engage the contact 31b.

FIG. 4f results from shifting the arm 28c to engage the contact 28a with the other three arms engaging the contact having the reference character b and the magnetic flux line 33–6 results. The magnetic flux line 33–7 shown in FIG. 4g is caused by shifting the arm 29c to engage contact 29a and the final change of energization of the sequence is the shifting of the arm 30c to engage contact 30a to produce the line 33–8. The next change is the shifting of the arm 31c to engage the contact 31a which produces the initial magnetization shown in FIG. 4a and is the first step of a new sequence.

Figure 3:
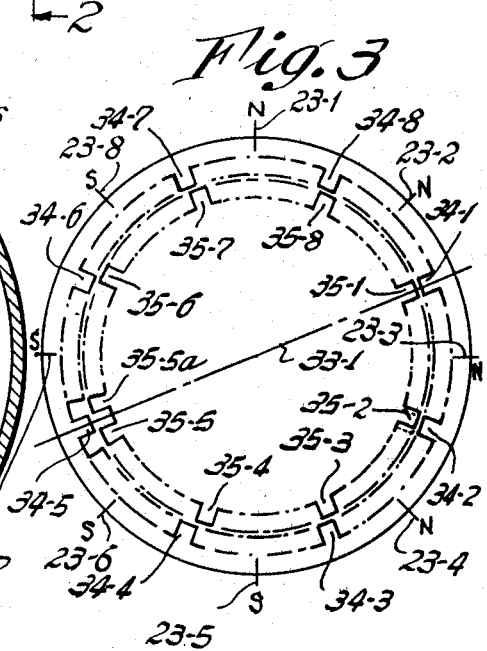
FIG. 3 is a diagramatic representation of the relative position of the teeth along a magnetic line.

Referring to FIG. 3 there is diagrammatically shown the poles when they are magnetized to have the same magnetism as shown in FIG. 4a with the magnetic flux concentration line 33–1 also being indicated. Aligned with the line 33–1 there is shown a tooth 34–1 of the stator while other stator teeth 34–2 through 34–8 are also represented. Opposite the tooth 34–1 is a tooth 35–1 that is formed on the end piece 16, the end piece magnetized S. Also, shown are other rotor teeth 35–2 through 35–8 and their position with relation to the stator teeth. The rotor tooth 35–1 is in direct alignment with the stator tooth 34–1 by reason of the end cap 16 being polarized to be an S and the tooth 34–1 an N so that the rotor will move to effect the alignment on the diametric magnetic flux line 33–1. Oppositely on the line 33–1, the tooth 34–5 is magnetically unlike the rotor teeth 35–5 and 35–5a so that these rotor teeth will effect a movement to have exact misalignment between them and the stator tooth 34–5 to provide ½ tooth pitch misalignment. The teeth in between the exactly aligned and misaligned teeth, will be positioned proportionally with respect to their position from the diametric flux line. Thus for example the teeth 35–3 and 35–7 which are diametrically aligned perpendicular to the flux line 33–1 will be ¼ of a tooth misplaced from the stator teeth 34–3 and 34–7 respectively. The rotor teeth 35–2 and 35–8 that are opposite the stator teeth 34–2 and 34–8 will be ⅛ of a rotor tooth pitch displaced from full alignment therewith.

When the poles are caused to be magnetized in the manner shown in FIG. 4b to produce the next increment of movement, the diametric flux line 33–2 will be aligned with the stator tooth 34–2 which will cause the tooth 35–2 of the rotor to align itself therewith as shown by the dotted tooth. The change of the rotor position from having one of its teeth in alignment with a different tooth of the stator is the incremental movement caused by one change of energization and is the reciprocal of the number of poles times the number of teeth in the rotor. The number of poles determines the number of changes of energization which causes alignment to exist before there is alignment with the same stator tooth and hence for the rotor to advance one rotor tooth pitch, eight changes of energization are required. For a complete revolution, there will be required a number of changes of energization equal to the number of poles times the number of rotor teeth.

In the discussion of FIG. 3, the teeth 34–1 through 34–8 have been shown and referred to. It is to be understood that these teeth do not actually exist because they are located where a gap exists between the two poles. However, if a gap did not exist, these teeth would be located in such a position.

When it is desired to hold the rotor stationary, the windings are maintained energized and thus there is a braking force which resists movement of the rotor from its position of minimum reluctance of the rotor and stator magnetic flux path.

It will be understood that the teeth of the end piece 16 and the teeth of the end piece 15 are rotatively displaced ½ a rotor tooth pitch from the other as the stator teeth are all in alignment. If desired, however, this may be reversed by aligning the teeth of the rotor end pieces and displacing one-half of the pole forming member a half a tooth pitch from the other half.

While the specific embodiment has been described with respect to 8 poles and 125 rotor teeth, the invention contemplates having, either or both, a different number of poles and/or a different number of teeth so that a different resolution could result. Thus while 8 poles and 125 rotor teeth provide 1000 steps per revolution, 50 teeth and 8 poles will provide 400 steps per revolution (which is twice that shown in the above-noted reissue patent which also has a 50 tooth rotor); a 125 tooth rotor with 6 poles would provide 750 increments per revolution, etc. Accordingly, the invention is not to be considered as being limited solely to the specific number of rotor teeth and stator poles. However, in all embodiments the rotor teeth will have a pitch which differs by 1 tooth from the possible number of stator teeth and the increment of movement is the reciprocal of the number of poles times the number of stator teeth.

It will also be understood that if the sequence of changes of energization is reversed, the rotor will move in the opposite direction as it follows the flux concentration line.

Though the electrical diagram of the circuit discloses manually operable switches, it is contemplated that these should be replaced by automatic circuitry utilizing electrically operated switch means such as transistors to effect a high stepping rate.

It will accordingly be appreciated that there has been disclosed a stepping motor which is capable of producing small incremental movement for each change of energization. The stator is formed with a plurality of poles and a change of energization causes two diametrically opposite poles to reverse their magnetism. However, at all conditions of operation, all the poles are magnetized with the poles of one magnetic polarity being positioned on one side of a diameter and the poles of the other magnetic polarity being positioned on the other side. The poles whose magnetism is reversed cause the diameter to rotate an increment which is the reciprocal of the number of poles. As both the stator poles and rotor are formed with teeth, with there being one tooth difference therebetween, the rotor will have one tooth align itself with the line of flux and its diametrically opposite part be misaligned. As the changes of energization proceed to shift the flux line, the tooth that is aligned will move therewith. Accordingly, for one revolution of the flux line which requires a number of changes of energization equal to the number of poles, the rotor will advance one tooth. For one complete revolution of the motor a number of changes of energization is required that is the product of the number of stator poles times the number of rotor teeth.

Variations and modifications may be made within the scope of the invention and portions of the improvements may be used without others.

I claim:

1. A stepping motor comprising a stator and a rotor; said rotor having a shaft, an end piece carried by the shaft, with the end piece being formed with a plurality of equally spaced teeth and means for providing a permanent magnetic field in the end piece; said stator being formed to have a plurality of inwardly extending poles with the periphery of the poles having equally spaced teeth; said rotor teeth and said stator teeth having a pitch which is different with the difference being one tooth; and means for magnetizing each pole with one half of the number of poles being magnetized of one polarity and the other half of the poles of the other polarity and with all poles of one polarity being adjacent each other.

2. The invention as defined in claim 1 in which the means for magnetizing all the poles includes means for reversing the polarity of one pair of opposite poles while retaining the same magnetism of the other poles.

3. The invention as defined in claim 2 in which each pole has winding means, in which the winding means of each pair of diametrically opposite poles are connected for simultaneous energization and in which the means for reversing the polarity causes simultaneous reversing of both poles.

4. The invention as defined in claim 2 in which there is an even number of poles, in which each pole has a winding means, the winding means for each pair of diametrically opposite poles being connected for simultaneous energization, in which each pair of winding means has means for reversing the energization in the winding means to cause a simultaneous reversal of the polarity of the pair of poles and in which each reversing means is independently operable from the other reversing means.

5. The invention as defined in claim 1 in which the rotor includes two end pieces each of which is formed with the same number of teeth on its periphery and the means for forming a permanent magnetic field includes a permanent magnet positioned between the two end pieces to magnetize each to have the opposite polarity.

6. The invention as defined in claim 1 in which all the poles of one polarity produce a flux having a concentration point, in which the poles of the other polarity produce a flux having a concentration point with the points being diametrically opposite each other.

7. The invention as defined in claim 6 in which the means for magnetizing includes means for reversing the magnetism of one pair of diametrically opposite poles to rotate the flux concentration points one fraction of a revolution that is equal to the reciprocal of the number of poles.

8. The invention as defined in claim 7 in which the rotor has one tooth that aligns itself with one flux concentration point, and in which the change of the flux concentration point causes another tooth to align itself with the changed flux concentration point, to thereby cause the rotor to advance an increment which is a reciprocal of the number of poles times the number of rotor teeth.

9. The invention as defined in claim 8 in which the rotor movement is in the same direction as the change in the flux concentration point.

10. A stepping motor comprising a stator and a rotor; said rotor having a shaft, an end piece carried by the shaft with the end piece being formed with a plurality of equally spaced rotor teeth and means for providing a unidirectional magnetic field in the end piece; said stator being formed to have a plurality of inwardly extending poles with the periphery of the poles having equally spaced stator teeth; said rotor teeth and said stator teeth having pitches and being disposed to limit the occurrence of exact alignment therebetween to one or more teeth of just one of the poles and to cause the teeth of all the other poles to be misaligned with the rotor teeth opposite thereto; and means for magnetizing each pole with one half of the number of poles being magnetized of one polarity and the other half of the poles of the other polarity and with all poles of one polarity being adjacent each other.

References Cited
UNITED STATES PATENTS

| | | | |
|---|---|---|---|
| Re. 25,445 | 9/1963 | Fredrickson | 310—163 |
| 2,424,843 | 7/1947 | Owsley | 318—20 |
| 3,117,268 | 1/1964 | Madsen | 310—49 X |
| 3,148,319 | 9/1964 | Fredrickson | 318—138 X |
| 3,293,459 | 12/1966 | Kreuter et al. | 310—49 |
| 3,343,014 | 9/1967 | Giles | 310—49 |
| 3,428,837 | 2/1969 | Morreale et al. | 310—49 |

WARREN E. RAY, Primary Examiner

U.S. Cl. X.R.

310—156, 184; 318—138